US009702296B2

(12) United States Patent
Yamagata et al.

(10) Patent No.: US 9,702,296 B2
(45) Date of Patent: Jul. 11, 2017

(54) TURBOCHARGED ENGINE (71) Applicant: MAZDA MOTOR CORPORATION, Hiroshima (JP)

(72) Inventors: Naoyuki Yamagata, Higashihiroshima (JP); Shuhei Tsujita, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 129 days.

(21) Appl. No.: 14/430,517

(22) PCT Filed: Dec. 4, 2013

(86) PCT No.: PCT/JP2013/007114
§ 371 (c)(1),
(2) Date: Mar. 23, 2015

(87) PCT Pub. No.: WO2014/091717
PCT Pub. Date: Jun. 19, 2014

(65) Prior Publication Data
US 2015/0240706 A1     Aug. 27, 2015

(30) Foreign Application Priority Data

Dec. 11, 2012   (JP) ................. 2012-270460

(51) Int. Cl.
F02D 23/00    (2006.01)
F02M 25/07   (2006.01)
(Continued)

(52) U.S. Cl.
CPC ............ F02B 37/183 (2013.01); F02B 31/02 (2013.01); F02D 21/08 (2013.01); F02D 23/02 (2013.01);
(Continued)

(58) Field of Classification Search
CPC ...... F02B 37/186; F02B 31/02; F02B 17/005; F02B 23/104; F02B 29/0406;
(Continued)

(56) References Cited

U.S. PATENT DOCUMENTS 5,033,268 A    7/1991 Hitomi et al.
5,941,066 A *  8/1999 Araki et al. ............ F02B 37/18
                                                            60/280
(Continued)

FOREIGN PATENT DOCUMENTS

CN           1755083 A     4/2006
CN         101397953 A     4/2009
(Continued)

OTHER PUBLICATIONS

International Search Report; PCT/JP2013/007114; Jan. 7, 2014.
(Continued)

Primary Examiner — Thai Ba Trieu
(74) Attorney, Agent, or Firm — Studebaker & Brackett PC (57) ABSTRACT An engine includes: a turbocharger including a turbine and a compressor; an EGR passage connecting an exhaust passage on an upstream side of the turbine and an air intake passage on a downstream side of the compressor; an EGR valve provided in the EGR passage; a bypass passage that bypasses the turbine; and a waste gate valve provided in the bypass passage. In the engine, when a boost pressure is increased to a limit pressure, a first boost pressure control is executed, in which the EGR valve is opened and the waste gate valve is closed. After the first boost pressure control starts, when an engine speed is increased to a prescribed value, a second boost pressure control is executed, in which the waste gate valve is opened in addition to the EGR valve.

12 Claims, 8 Drawing Sheets

(51) Int. Cl.
*F02B 37/18* (2006.01)
*F02D 21/08* (2006.01)
*F02D 23/02* (2006.01)
*F02D 41/40* (2006.01)
*F02P 15/02* (2006.01)
*F02D 41/00* (2006.01)
*F02D 37/02* (2006.01)
*F02B 31/02* (2006.01)
*F02M 26/20* (2016.01)
*F02M 26/05* (2016.01)
*F02B 17/00* (2006.01)
*F02B 23/10* (2006.01)
*F02B 29/04* (2006.01)
*F02B 23/08* (2006.01)
*F02M 26/13* (2016.01)
*F02M 26/23* (2016.01)

(52) U.S. Cl.
CPC ........... *F02D 37/02* (2013.01); *F02D 41/005* (2013.01); *F02D 41/0007* (2013.01); *F02D 41/402* (2013.01); *F02M 26/05* (2016.02); *F02M 26/20* (2016.02); *F02P 15/02* (2013.01); *F02B 17/005* (2013.01); *F02B 23/104* (2013.01); *F02B 29/0406* (2013.01); *F02B 2023/085* (2013.01); *F02B 2023/108* (2013.01); *F02M 26/13* (2016.02); *F02M 26/23* (2016.02); *Y02T 10/144* (2013.01); *Y02T 10/146* (2013.01); *Y02T 10/44* (2013.01); *Y02T 10/47* (2013.01)

(58) Field of Classification Search
CPC ......... F02B 2023/085; F02B 2023/108; F02M 26/20; F02M 25/0706; F02M 25/0726; F02D 21/08; F02D 23/02; F02D 37/02; F02D 41/0007; F02D 41/005; F02D 41/402; F02P 15/02; Y02T 10/144; Y02T 10/146; Y02T 10/44; Y02T 10/47
USPC .................................. 60/602, 605.2; 701/108
See application file for complete search history.

(56) References Cited

U.S. PATENT DOCUMENTS

| | | | | |
|---|---|---|---|---|
| 7,421,999 | B2* | 9/2008 | Kim | F02D 41/0025 123/295 |
| 8,161,746 | B2* | 4/2012 | Ulrey | F02D 41/0007 60/605.2 |
| 8,997,707 | B2* | 4/2015 | Ulrey | B60H 1/00778 123/568.12 |
| 2006/0117751 | A1 | 6/2006 | Todoroki et al. | |
| 2008/0000445 | A1* | 1/2008 | Kim | F02D 41/0025 123/295 |
| 2009/0077968 | A1 | 3/2009 | Sun | |
| 2010/0050634 | A1* | 3/2010 | Yager | F02M 25/0707 60/605.2 |
| 2010/0154412 | A1* | 6/2010 | Andreae | F02M 25/0707 60/605.2 |
| 2011/0209690 | A1* | 9/2011 | Ulrey | F02D 41/0007 123/564 |
| 2011/0239645 | A1 | 10/2011 | Nagoshi et al. | |
| 2012/0111100 | A1* | 5/2012 | Tsujii | F02D 41/1497 73/114.34 |

FOREIGN PATENT DOCUMENTS

| | | | |
|---|---|---|---|
| CN | 102207038 A | | 10/2011 |
| JP | H06-257519 A | | 9/1994 |
| JP | 2005-220761 A | | 8/2005 |
| JP | 2006-299859 A | | 11/2006 |
| JP | 2007-315173 A | | 12/2007 |
| JP | 2008157139 A | * | 7/2008 |
| JP | 2010096049 A | * | 4/2010 |
| JP | 2011226391 A | * | 11/2011 |
| JP | 2012-197716 A | | 10/2012 |

OTHER PUBLICATIONS

The First Office Action issued by the Chinese Patent Office on Nov. 17, 2016, which corresponds to Chinese Patent Application No. 201380049606.8 and is related to U.S. Appl. No. 14/430,517; with English language summary.

* cited by examiner

TURBOCHARGED ENGINE

TECHNICAL FIELD

The present invention relates to a turbocharged engine equipped with a turbocharger including: a turbine driven by energy of exhaust gas passing through an exhaust passage; and a compressor driven by the turbine to apply pressure to air in an intake passage.

BACKGROUND ART

The turbocharger aims at achieving high output of an engine using energy of exhaust gas discharged from the engine, and is widely adopted in various conventional engines.

In the engine equipped with a turbocharger, since a boost pressure reaches a limit pressure when an engine speed is increased to a certain extent, it is necessary to perform a boost pressure control for preventing the boost pressure from exceeding the limit pressure.

For instance, the turbocharged engine described in Patent Document 1 includes: a bypass passage that bypasses a turbine of the turbocharger; and a waste gate valve provided in the bypass passage. When the engine speed becomes equal to or higher than an intercept speed (a rotational speed when the boost pressure reaches the limit pressure in full load condition), the waste gate valve is opened and part of the exhaust gas flows in the bypass passage. Thus, an amount of exhaust gas flowing into the turbine is reduced and an increase in the boost pressure is suppressed.

The engine of Patent Document 1 further includes: an EGR passage mutually connecting an exhaust passage and an intake passage of the engine; and an EGR valve provided in the EGR passage. In a high speed area equal to or higher than the intercept speed, while the waste gate valve is opened, the EGR valve is closed. Thereby, a flow of the exhaust gas passing through the EGR passage is cut off, and an operation of returning the exhaust gas from the exhaust passage to the intake passage (Exhaust Gas Recirculation) is stopped.

Even by, as Patent Document 1, opening the waste gate valve and closing the EGR valve at the intercept speed and resultantly suppressing a flow rate of the exhaust gas flowing into the turbine, when the engine speed is further increased from the status and the flow rate of the exhaust gas increases, pressure of the exhaust gas (the exhaust pressure) in the upstream of the turbine gradually increases. On the other hand, since the boost pressure, in other words, a pressure of the intake passage in the downstream of the compressor, is maintained constant, an increment of the exhaust pressure with respect to the boost pressure becomes large as the engine speed is increased. Thereby, a pumping loss is increased, which leads to degradation in fuel economy performance.

CITATION LIST

Patent Literature

Patent Literature 1: Japanese Unexamined Patent Publication No. 2007-315173

SUMMARY OF INVENTION

The present invention is made in view of the circumstances as described above, and aims at providing a turbocharged engine capable of improving engine fuel economy performance while appropriately performing a boost pressure control for suppressing the boost pressure.

The turbocharged engine of the present invention to solve the problem includes: an engine body including at least one cylinder; an intake passage for introducing air into the cylinder; an exhaust passage for discharging exhaust gas generated in the cylinder; a turbocharger including a turbine driven by energy of the exhaust gas passing through the exhaust passage and a compressor driven by the turbine to apply pressure to air in the intake passage; an EGR passage connecting the exhaust passage on the upstream side of the turbine and the intake passage on the downstream side of the compressor; an openable/closable EGR valve provided in the EGR passage; a bypass passage provided in the exhaust passage so as to bypass the turbine; an openable/closable waste gate valve provided in the bypass passage; and a controller for controlling the EGR valve and the waste gate valve so as to prevent the boost pressure generated by the compressor from exceeding a predetermined limit pressure in a specific operation area set in at least part of a speed range in which an engine speed becomes equal to or higher than the a predetermined first rotational speed. The controller implements, when the boost pressure is increased to the limit pressure, a first boost pressure control in which the EGR valve is opened and the waste gate valve is closed, and implements, after starting the first boost pressure control and when the engine speed is increased to a second rotational speed higher than the first rotational speed, a second boost pressure control in which the waste gate valve is opened in addition to the EGR valve.

In a configuration of "the first boost pressure control of opening the EGR valve and closing the waste gate valve", "closing the waste gate valve" intends that it is acceptable when the waste gate valve is substantially closed so that an amount of the exhaust gas flowing in the bypass passage becomes sufficiently small, and it is not always necessary that the waste gate valve is completely closed (opening degree 0%).

According to the turbocharged engine of the present invention, fuel economy performance of the engine may be improved while appropriately as needed performing the boost pressure control for suppressing the boost pressure.

DESCRIPTION OF EMBODIMENTS

(1) An Entire Configuration of the Engine

Figure 1:
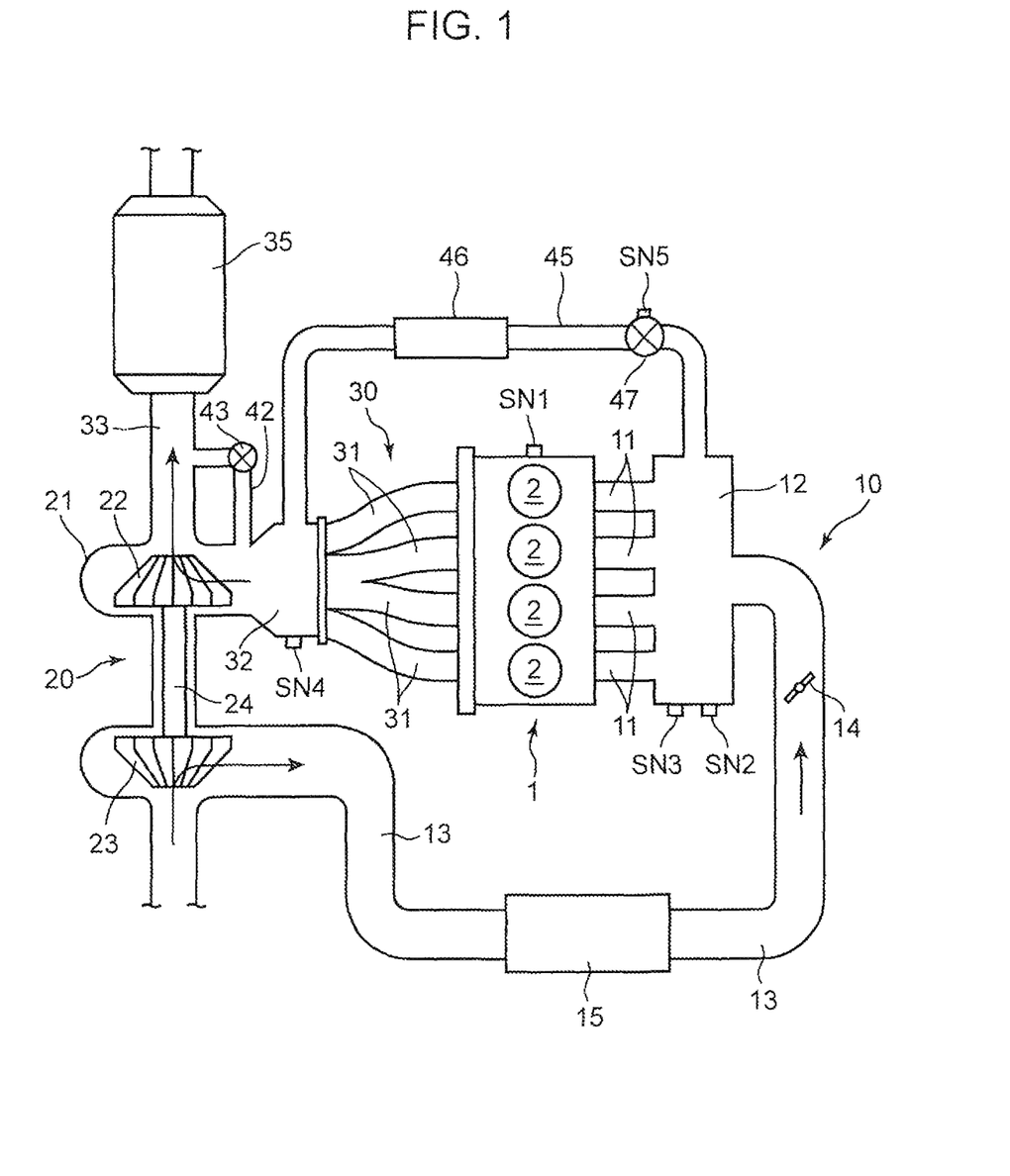
FIG. 1 is a view illustrating an entire configuration of a turbocharged engine related to one embodiment of the present invention.
Figure 2:
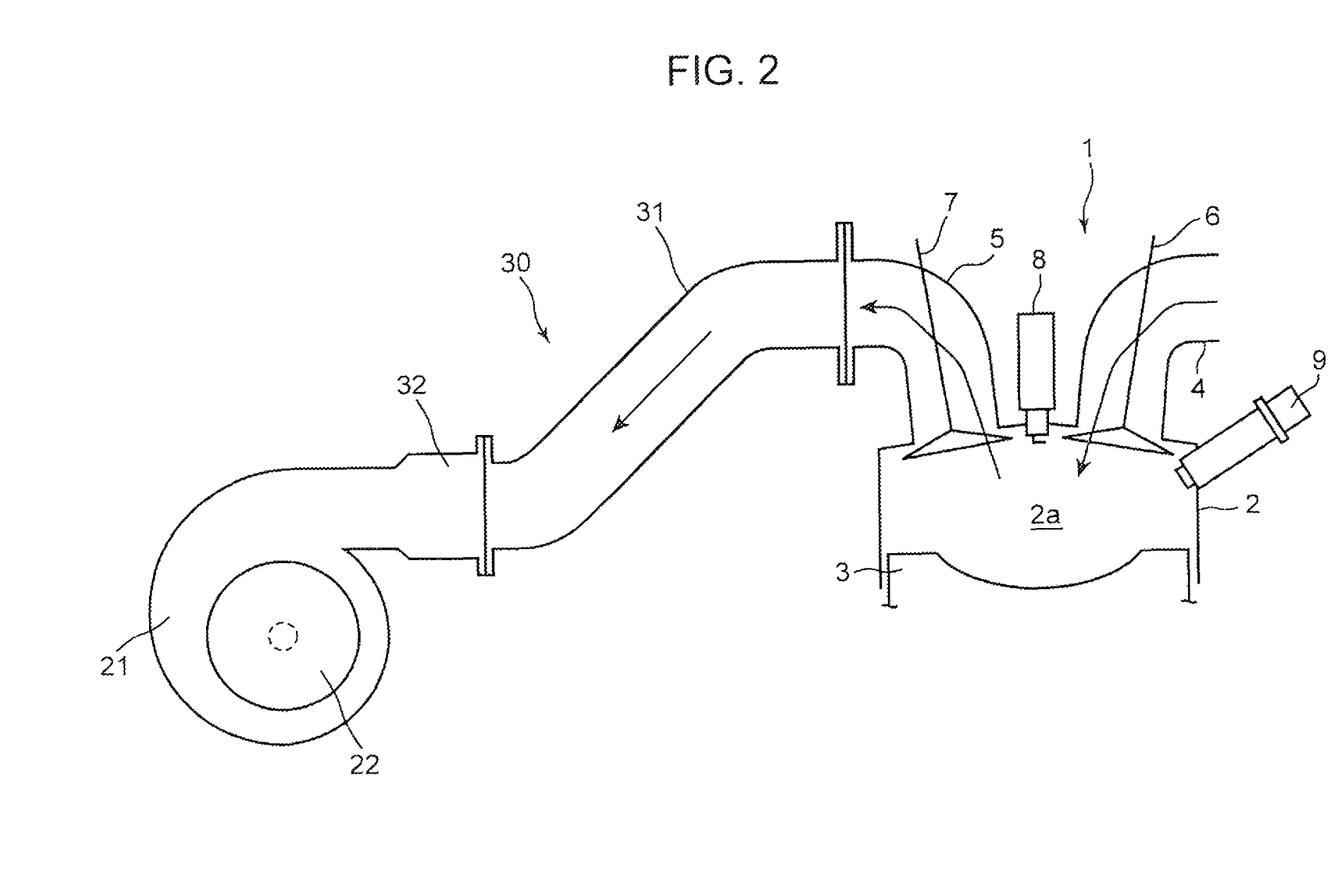
FIG. 2 is a side view of a main part of the engine.

FIG. 1 and FIG. 2 illustrate a turbocharged engine of one embodiment of the present invention. The engine illustrated in the figures is a four-cycle spark-ignition multi-cylinder gasoline engine mounted on a vehicle as a power source for traveling. Specifically, the engine of the embodiment includes: an inline 4-cylinder engine body 1 having four cylinders 2 aligned in a row; an intake passage 10 for introducing air into each cylinder 2 of the engine body 1; an exhaust passage 30 for discharging exhaust gas generated in each cylinder 2 of the engine body 1; and a turbocharger 20 driven by energy of the exhaust gas.

In each cylinder 2 of the engine body 1, a piston 3 slidable back and forth is inserted, and a combustion chamber 2a is formed as a divided section above each piston 3. In the combustion chamber 2a, an air-fuel mixture of air and fuel injected from an injector 9 described later combusts, and expansion energy by the combustion slides the piston 3 back and forth. The back-and-forth motion of the piston 3 is converted to a rotary motion of a crank shaft (an output shaft) through a crank mechanism not shown in the figure. On one end side of the crank shaft, an engine speed sensor SN1 for detecting a rotational speed of the crank shaft (that is, an engine speed) is provided.

An upper part of the engine body 1 (a cylinder head) is provided with: an intake port 4 for introducing air supplied from the intake passage 10 to a combustion chamber of each cylinder 2; an intake valve 6 for opening and closing the intake port 4; an exhaust port 5 for leading the exhaust gas generated in the combustion chamber 2a of each cylinder 2 to the exhaust passage 30; and an exhaust valve 7 for opening and closing the exhaust port 5. The intake valve 6 and the exhaust valve 7 are driven to be opened and closed in conjunction with rotation of the crank shaft of the engine body 1 by a valve mechanism (not shown in the figure) including a camshaft, a cam, and such.

The upper part of the engine body 1 (the cylinder head) is provided with, for each cylinder 2, a pair of the injector 9 for injecting a fuel (here, a fuel including gasoline as a primary component) toward the combustion chamber 2a of each cylinder 2 and an spark plug 8 (an igniter) providing the air-fuel mixture of air and fuel injected from the injector 9 with ignition energy.

The spark plug 8 has an electrode part protruding from a center of a ceiling part of each cylinder 2 into the combustion chamber 2a, and a spark discharged from the electrode part is supplied to the air-fuel mixture as ignition energy. The injector 9 is provided so as to be directed to a center of the combustion chamber 2a from a side of the intake side of each cylinder 2, and injects the fuel toward a part under the electrode part of the spark plug 8.

The intake passage 10 includes: four independent intake passages 11 each connecting to an intake port 4 of each cylinder 2; a surge tank 12 that is connected to each of the independent intake passages 11 on an upstream side (an upstream side in a flow direction of the intake air) thereof, and a single-tube shaped intake pipe 13 provided in an upstream side of the surge tank 12.

The intake pipe 13 is provided with; an openable/closable throttle valve 14 for adjusting an amount of intake air; and an intercooler 15 for cooling air compressed by the turbocharger 20. The surge tank 12 is provided with an air flow sensor SN2 for detecting the amount of intake air; and an intake pressure sensor SN3 for detecting a pressure of the intake air.

The exhaust passage 30 includes: the four independent exhaust passages 31 each connecting to the exhaust port 5 of each cylinder 2; an exhaust collecting section 32 at which downstream ends of independent exhaust passages 31 (downstream side ends in the flow direction of the exhaust gas) gather together; and a single-tube shaped exhaust pipe 33 provided in a downstream side of the exhaust collecting section 32.

The exhaust pipe 33 is provided with a silencer (not shown in the figure), a catalyst converter 35 having a built-in catalyst such as a three-way catalyst, and such. The exhaust collecting section 32 is provided with an exhaust pressure sensor SN4 for detecting a pressure of the exhaust gas (an exhaust pressure).

The turbocharger 20 includes: a turbine housing 21 provided directly in a downstream of the exhaust collecting section 32 of the exhaust passage 30 (between the exhaust collecting section 32 and the exhaust pipe 33); a turbine 22 disposed in the turbine housing 21; a compressor 23 disposed in the intake pipe 13; and a connecting shaft 24 for mutually connecting the turbine 22 and the compressor 23. While the engine is being operated, when exhaust gas is discharged from each cylinder 2 of the engine body 1, by the exhaust gas flowing into the turbine housing 21 of the turbocharger 20 through the independent exhaust passages 31 and such, the turbine 22 receives energy of the exhaust gas and rotates at a high speed. By the compressor 23 connected to the turbine 22 through a connecting shaft 24 being driven at the same rotational speed as the turbine 22, intake air passing through the intake pipe 13 is compressed and is pumped into each cylinder 2 of the engine body 1.

The exhaust passage 30 is provided with a bypass passage 42 for bypassing the turbine 22 of the turbocharger 20 so as to mutually connect the turbine housing 21 and the exhaust pipe 33 in the downstream side thereof, and in a middle part of the bypass passage 42, an openable/closable waste gate valve 43 is provided. When the waste gate valve 43 is opened, since at least part of the exhaust gas discharged from the engine body 1 passes through the bypass passage 42, an amount of the exhaust gas flowing into the turbine 22 is reduced and a driving force of the turbine 22 is suppressed.

The exhaust passage 30 and the intake passage 10 are mutually connected through the EGR passage 45. The EGR passage 45 is a passage for performing a so-called Exhaust Gas Recirculation that returns part of the exhaust gas discharged from the engine body 1 to the intake side. One end part of the EGR passage 45 is connected to the exhaust passage 30 in the upstream side of the turbine 22, more specifically, to the exhaust collecting section 32, and the other end of the EGR passage 45 is connected to the intake passage in the downstream side of the compressor 23, more specifically, to the surge tank 12.

The EGR passage 45 is provided with: an EGR cooler 46 for cooling the EGR gas (the exhaust gas that is returned to the intake system); and an openable/closable EGR valve 47 for controlling a flow rate of the EGR gas passing through the EGR passage 45. The EGR valve 47 is provided with an EGR opening degree sensor SN5 for detecting an opening degree thereof.

(2) Control System

Figure 3:
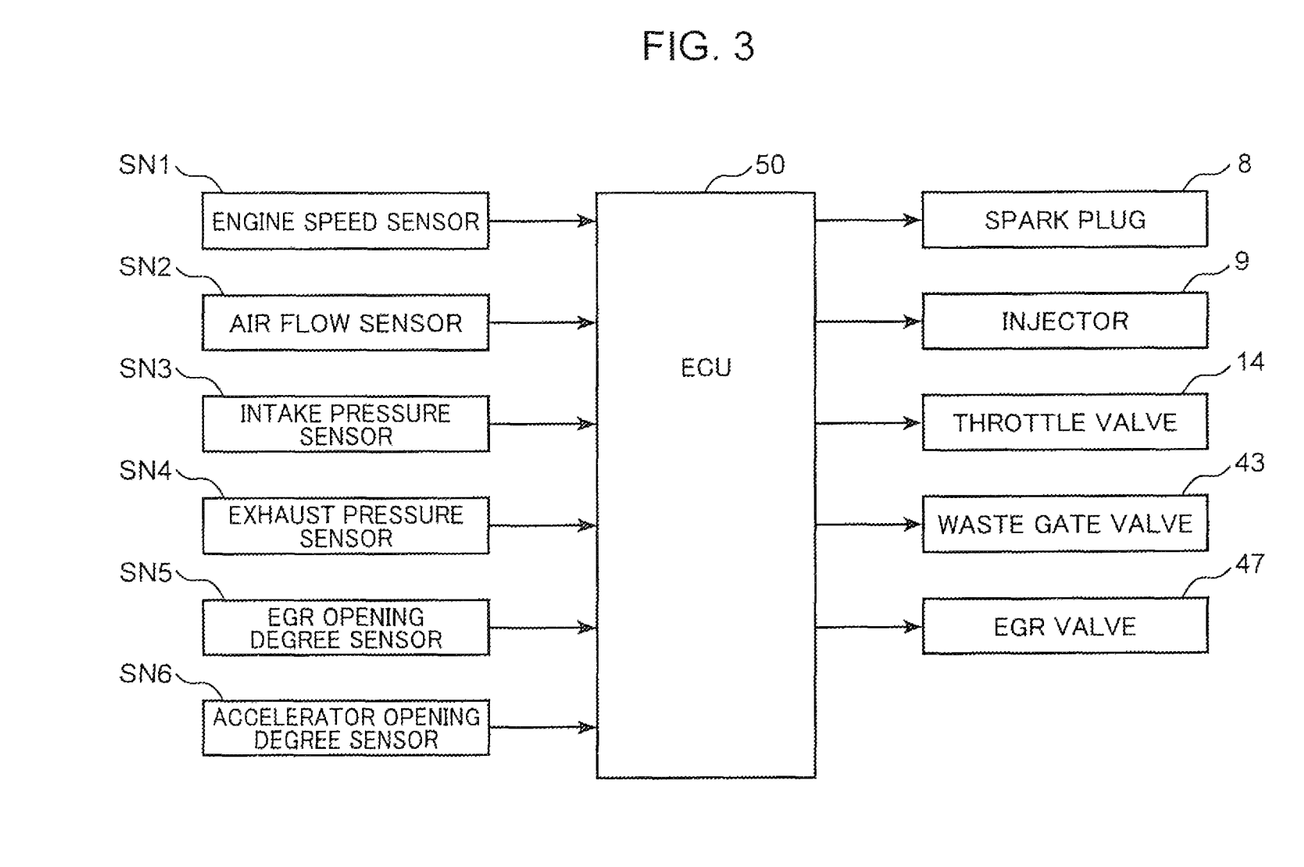
FIG. 3 is a block diagram illustrating a control system of the engine.

Next, a control system of the engine is described with reference to FIG. 3. Each part of the engine of the embodiment is comprehensively controlled by an ECU (Engine Control Unit) 50. The ECU 50, as is well known, is a microprocessor configured by CPU, ROM, RAM, and such, which corresponds to a "controller" in Claims.

To the ECU 50, various kinds of information are sequentially input. Specifically, the ECU 50 is electrically coupled to the engine speed sensor SN1, the air flow sensor SN2, the intake pressure sensor SN3, the exhaust pressure sensor SN4, and the EGR opening degree sensor SN5 that are provided at each part of the engine. A vehicle of the embodiment is provided with an accelerator opening degree sensor SN6 for detecting an opening degree of an accelerator pedal (an accelerator opening degree) operated by a driver (not shown in the figure), and the ECU 50 is electrically coupled also to the accelerator opening degree sensor SN6. The ECU 50 acquires on the basis of input signals from the sensors SN1 to SN6 various kinds of information such as an engine speed, an amount of intake air, a boost pressure (a pressure of the intake air in the downstream of the compressor 23), an exhaust pressure (a pressure of the exhaust gas in the upstream of the turbine 22), an opening degree of the EGR valve 47, and an accelerator opening degree.

The ECU 50 controls each part of the engine while executing various calculations on the basis of an input signal from each of the sensors SN1 to SN6. In other words, the ECU 50 is electrically coupled to the spark plug 8, the injector 9, the throttle valve 14, the waste gate valve 43, and the EGR valve 47, and outputs a drive control signal to each of these instruments, respectively, on the basis of the results of above calculations.

(3) Boost Pressure Control

Next, a specific example of an engine control performed by the ECU 50 is described with reference to a map in FIG. 4.

Figure 4:
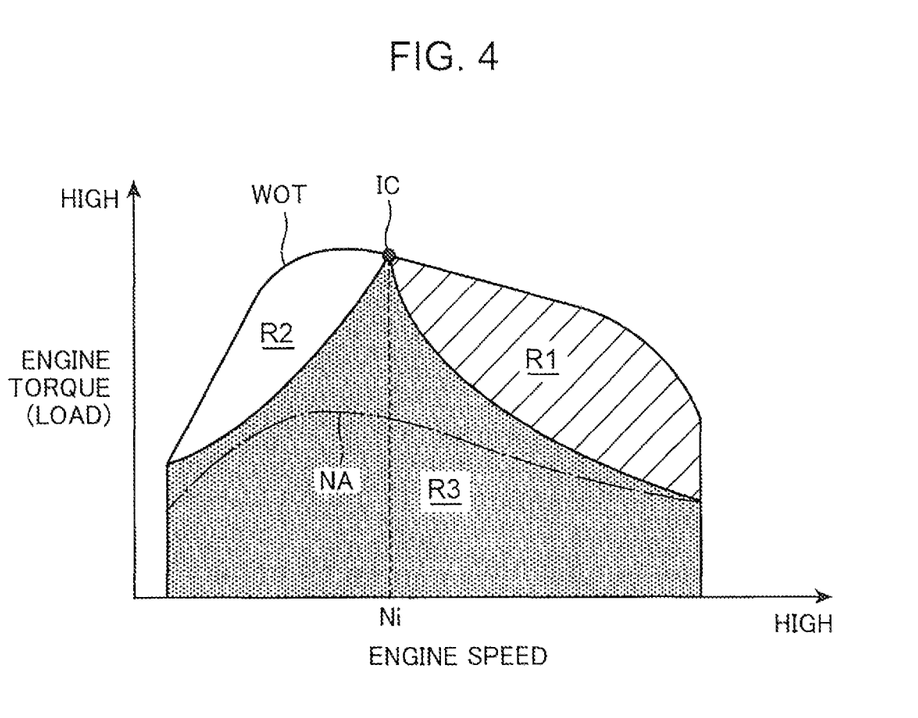
FIG. 4 is an explanatory diagram that segments an operation area of the engine according to whether the boost pressure control for suppressing the boost pressure is needed.

In FIG. 4, WOT represents a full load line of the engine (an engine torque when the accelerator is fully opened). In the embodiment, since the engine is provided with the turbocharger 20, the full load line WOT of the engine is set higher than a natural intake line NA, which is an upper limit of the engine torque in natural intake (no turbocharging).

A point IC present on the full load line WOT is a so-called intercept point. The intercept point IC means an operation point where a pressure of the intake air compressed by the compressor 23 of the turbocharger 20, in other words, the boost pressure, reaches a predetermined limit pressure (boost pressure set for protecting the engine and the turbocharger), and is a point where a boost pressure control starts to prevent the boost pressure from rising higher than that. Hereinafter, an engine speed Ni corresponding to the intercept point IC is referred to as an "intercept speed Ni". The intercept speed Ni corresponds to a "first rotational speed" in Claims.

In the map in FIG. 4, an area on a high load side in a speed range in which the engine speed becomes equal to or higher than the intercept speed Ni is referred to as a first operation area R1. An area on a high load side in a speed range in which the engine speed becomes lower than the intercept speed Ni is referred to as a second operation area R2. In other words, the first operation area R1 may be said to be an area of high speed and high load including a range on a higher speed side of the intercept speed Ni on the full load line WOT of the engine. The second operation area R2 may be said to be an area of low speed and high load including a range on a lower speed side of the intercept speed Ni on the full load line WOT of the engine. A residual area other than the first operation area R1 and the second operation area R2 is referred to as a third operation area R3.

The first operation area R1 of high speed and high load corresponds to a "specific operation area" in Claims. In the first operation area R1, a flow rate of the exhaust gas is likely to become higher than that in the other operation areas (R2, R3), and a boost pressure is likely to become high. Therefore, in the first operation area R1, a control of adjusting opening degrees of the EGR valve 47 and the waste gate valve 43 so as to prevent the boost pressure from exceeding the limit pressure is performed as a boost pressure control. Although the details are described later, in the first operation area R1, the EGR valve 47 is at least open and the waste gate valve 43 is opened or closed.

In the second operation area R2 of low speed and high load, both the EGR valve 47 and the waste gate valve 43 are closed.

In the third operation area R3 other than the first and second operation areas R1, R2, only the EGR valve 47 is opened, and the waste gate valve 43 is maintained in a closed state. The opening of the EGR valve 47 here does not aim at controlling the boost pressure, but aims at satisfying a requirement relative to exhaust emissions and reducing a pumping loss.

The boost pressure control performed in the first operation area R1 is described more in detail. The boost pressure control of the embodiment includes: a first boost pressure control of opening the EGR valve 47 and closing the waste gate valve 43; and a second boost pressure control of opening both the waste gate valve 43 and the EGR valve 47. The first boost pressure control and the second boost pressure control are selectively used depending on a magnitude of an EGR rate. The EGR rate is a value obtained by dividing an amount of the EGR gas introduced to each cylinder 2 by a total gas amount (a sum of an amount of intake air and the EGR gas amount introduced to each cylinder 2) and multiplying this value by 100, in other words, is a value of a rate of the EGR gas amount to the total gas amount expressed in percentage.

When an operation point of the engine is shifted to the first operation area R1 of high speed and high load, accordingly, the boost pressure is increased to the limit pressure. The ECU 50 detects the boost pressure increase on the basis of information (an actually measured value of the boost pressure) input from the intake pressure sensor SN3. The ECU 50 first performs the first boost pressure control of opening the EGR valve 47 while maintaining the waste gate valve 43 closed. The first boost pressure control is kept continued unless the EGR rate reaches the predetermined upper limit value. Then, when the EGR rate reaches the upper limit value, the ECU 50 switches over to the second boost pressure control of opening the waste gate valve 43 in addition to the EGR valve 47 so as to prevent the EGR rate from rising more.

The EGR rate that is a reference to determine whether to use the first boost pressure control or the second boost pressure control may be estimated from the opening degree of the EGR valve 47 and a difference between pressures before and after the EGR valve 47. Specifically, the ECU 50 reads a target opening degree of the EGR valve 47 from a predetermined map data on the basis of an operational state (a rotational speed and a load) identified from detected values of the engine speed sensor SN1, the accelerator opening degree sensor SN6, and such when the engine is in operation, and controls the EGR valve 47 so as to make the opening degree of the EGR valve 47 to match the target opening degree. In addition, The ECU 50 identifies a difference between a pressure in the exhaust collecting section 32 detected by the exhaust pressure sensor SN4 and a pressure in the surge tank 12 detected by the intake pressure sensor SN3 as a difference between pressures before and after the EGR valve 47, and estimates a flow rate of the EGR gas passing through the EGR passage 45 on the basis of the identified pressure difference and an opening degree of the EGR valve 47 detected by the EGR opening degree sensor SN5. The ECU 50 further identifies the total gas amount, which is a sum of both flow rates of the intake air and the EGR gas, from a detection value of the air flow sensor SN2, and calculates the EGR rate on the basis of the total gas amount and the estimated flow rate of the EGR gas.

As described above, the ECU 50, when the engine is in operation, sequentially estimates the EGR rate by calculation on the basis of information obtained from various kinds of sensors. When the engine is in operation in the first operation area R1 where the boost pressure is required to be suppressed, according to whether the estimated EGR rate is increased to the predetermined upper limit value, either the first boost pressure control of opening only the EGR valve 47 or the second boost pressure control of opening both the EGR valve 47 and the waste gate valve 43 is alternatively performed.

Figure 5:
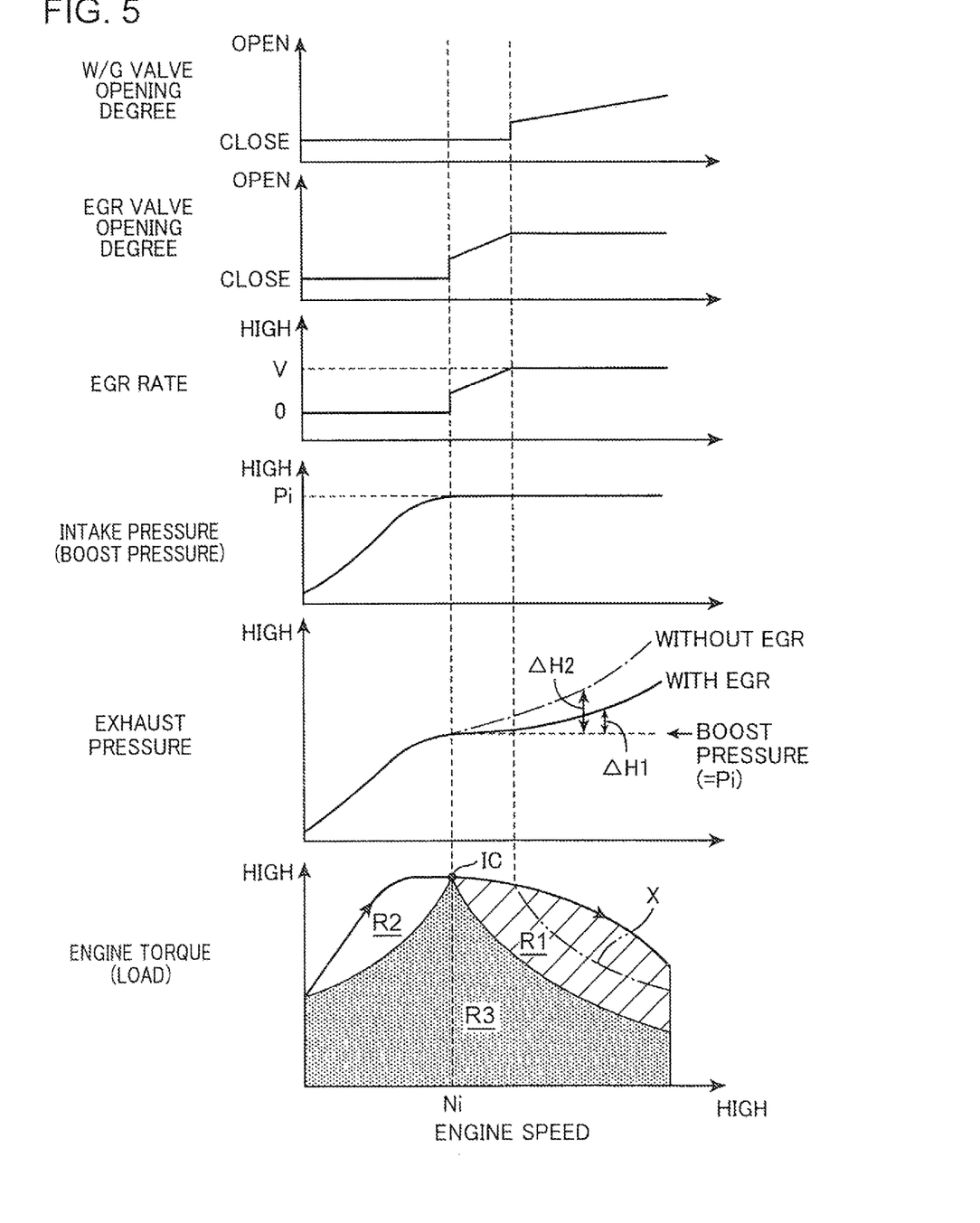
FIG. 5 is diagram illustrating various state quantities when engine speed in full load condition changes.

FIG. 5 is a diagram illustrating changes of the opening degrees of the waste gate valve 43 and the EGR valve 47, the EGR rate, the intake pressure (a pressure of the intake air in the downstream of the compressor 23, or boost pressure), and the exhaust pressure (a pressure of the exhaust gas in the upstream of the turbine 22), when an operation point of the engine is shifted along the full load line WOT from a low speed side to a high speed side. As illustrated in the diagram, while the operation point of the engine is in a speed range lower than the intercept point IC, the intake pressure and the exhaust pressure is increased in proportion to the engine speed. In other words, when the engine in in operation in the low speed side of the intercept point IC on the full load line WOT, since the EGR valve 47 and the waste gate valve 43 are both set to be fully closed, the exhaust gas discharged from each cylinder 2 is all introduced to the turbine 22. Therefore, when the engine speed is increased and the flow rate of the exhaust gas increases, accordingly, the exhaust pressure is increased, boosting ability of the compressor 23 improves, and the boost pressure, which is an intake pressure in the downstream of the compressor 23, is increased.

On the other hand, when an operation point of the engine reaches the intercept point IC, the boost pressure is increased to a limit pressure (Pi expressed in a graph of the intake pressure in FIG. 5), which paves the way to open the EGR valve 47. In other words, the first boost pressure control in which only the EGR valve 47 is opened while the waste gate valve 43 is kept closed is started. In the first boost pressure control, by the EGR valve 47 being opened, part of the exhaust gas discharged from each cylinder 2 is returned to the intake passage 10 through the EGR passage 45 connected to the exhaust collecting section 32. Thereby, since an amount of the exhaust gas flowing into the turbine 22 disposed in the downstream side of the exhaust collecting section 32 is reduced, the increase in the boost pressure is stopped and the boost pressure is maintained at the limit pressure Pi.

When the operation point is shifted to a high speed side beyond the intercept point IC, in order to maintain the boost pressure at the limit pressure Pi, an opening degree of the EGR valve 47 is increased in proportion to the engine speed. Thus, since an amount of the exhaust gas (EGR gas) returned to the intake passage 10 from the exhaust passage 30 through the EGR passage 45 is increased, boosting ability of the compressor 23 is suppressed and the EGR rate is increased. When the EGR rate is increased to an upper limit value (V expressed in a graph of the EGR rate in FIG. 5), the waste gate valve 43 is opened in addition. In other words, the second boost pressure control of opening both the EGR valve 47 and the waste gate valve 43 is started. In a map at the lowermost part of FIG. 5, a line where the EGR rate reaches the upper limit value V is expressed as X. In other words, in the embodiment, after starting the first boost pressure control, when the engine speed is increased to a rotational speed corresponding to the line X, the boost pressure control is switched over from the first boost pressure control to the second boost pressure control. The rotational speed corresponding to the line X corresponds to "a second rotational speed" in Claims.

The upper limit value V of the EGR rate, which is a threshold for switching over from the first boost pressure control to the second boost pressure control, may be set at 25%, for instance. Of course, the upper limit value V may possibly be changed properly depending on engine characteristics, and is not limited to 25%. However, considering both combustion stability and fuel economy, the upper limit value V is preferably to be set at a value between 20 and 40%, more preferably, between 20 and 30%.

When the second boost pressure control is being performed, the opening degree of the waste gate valve 43 is increased as the engine speed is increased so that the boost pressure is maintained at the limit pressure Pi even when the engine speed is increased (a flow rate of the exhaust gas is increased). On the other hand, the EGR valve 47 is basically maintained at a constant value to suppress the EGR rate to a value equal to or lower than the upper limit value V.

In association with the second boost pressure control, when not only the EGR valve 47 but also the waste gate valve 43 is opened, since part of the exhaust gas is returned to the intake passage 10 through the EGR passage 45 and part of other exhaust gas flows in the bypass passage 42 (in other words, bypasses the turbine 22), a rate of the exhaust gas flowing into the turbine 22 to the total exhaust gas amount is further reduced. In this way, by additionally opening the waste gate valve 43 (making a flow of the exhaust gas bypassing the turbine 22), the boosting ability of the compressor 23 is suppressed and the boost pressure may be maintained at the limit pressure Pi, while suppressing the EGR rate to a value equal to or lower than the upper limit value V.

In the first operation area R1 where the first or the second boost pressure control is performed, since the engine speed and the load are high and part of the exhaust gas is introduce to the cylinders 2 as the EGR gas, combustion in the cylinders 2 is likely to become unstable. To cope with such a problem, in the embodiment, during an operation in the first operation area R1, split injections in which fuel injection from the injector 9 is split into several injections are performed.

Figure 6:
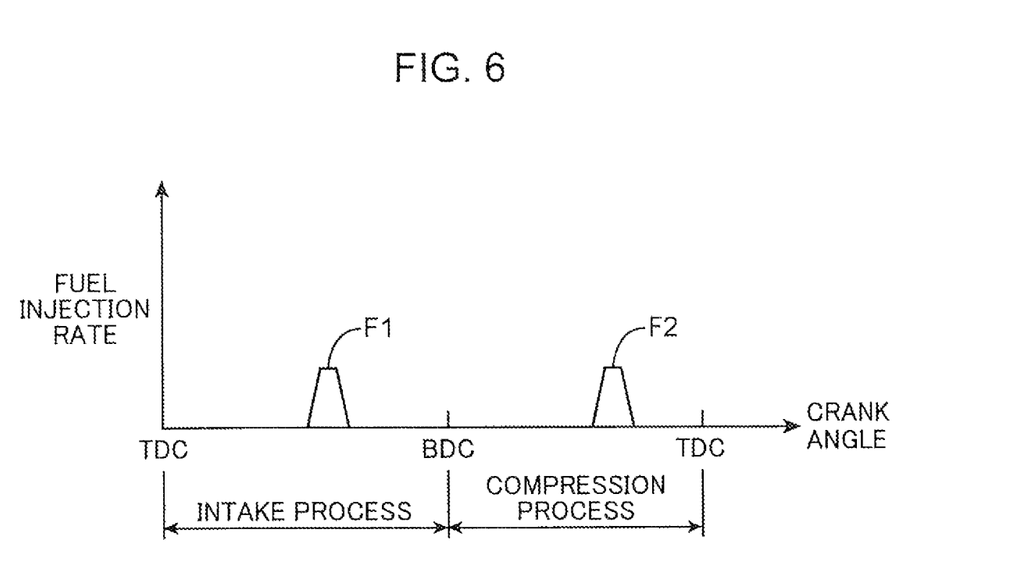
FIG. 6 is a diagram illustrating an aspect of fuel injection in the operation area in which the boost pressure control is performed.
Figure 7:
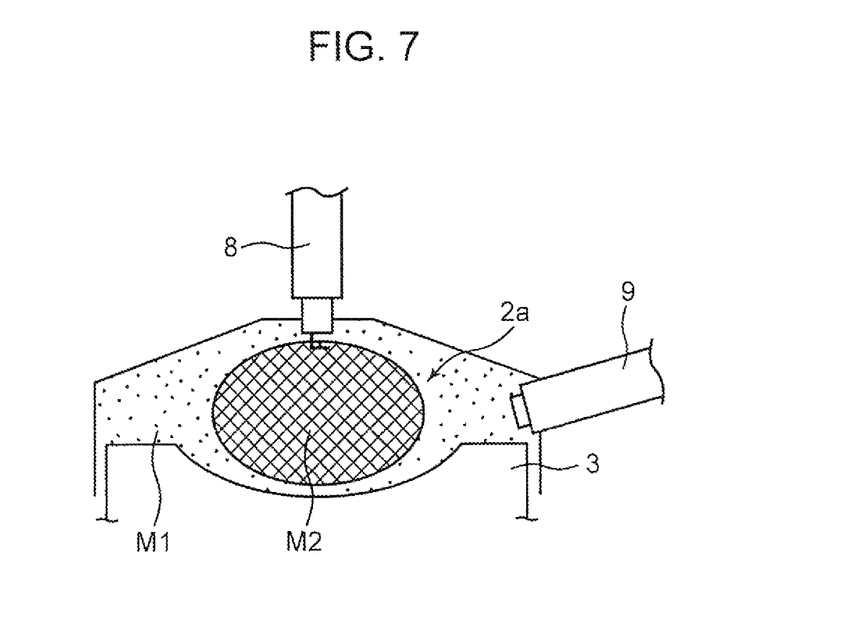
FIG. 7 is a view illustrating a distribution of an air-fuel mixture formed by the fuel injection in the cylinder.

Specifically, during operation in the first operation area R1, the ECU 50, as illustrated in FIG. 6, injects a fuel from the injector 9 in separate processes of a first-stage injection F1 in an intake process and a second-stage injection F2 in the latter half of a compression process. In this way, when the fuel is injected separately at the first-stage injection F1 and the second-stage injection F2, as illustrated in FIG. 7, at a time point near a compression top dead center, a rich air-fuel mixture M2 based on the first-stage injection F1 and the second-stage injection F2 is formed at a center side of the combustion chamber 2a (in a neighborhood of an electrode part of the spark plug 8), and a relatively lean air-fuel mixture M1 based on only the first-stage injection F1 is formed therearound. Then, when a spark is discharged from an electrode part of the spark plug 8 near the compression top dead center, since the spark (ignition energy) acts on the relatively rich air-fuel mixture M2, the air-fuel mixture M2 is relatively easily ignited, and kindling (a flame kernel) is formed. Once kindling is formed, even when a some amount of the EGR gas, which is an inert gas, is present in the combustion chamber 2a, since flame propagation around the kindling proceeds without any problem, a misfire never occurs in the midway.

In this way, in the first operation area R1 where the EGR is performed, for securing combustion stability, fuel injection from the injector 9 is implemented in several injections and a relatively rich air-fuel mixture (M2 in FIG. 7) is formed in a neighborhood of the spark plug 8.

(4) Action, Etc

As described above, the engine of the embodiment includes: the turbocharger 20 including the turbine 22 and the compressor 23; the EGR passage 45 connecting the exhaust passage 30 (the exhaust collecting section 32) in the upstream side of the turbine 22 and the intake passage 10 (the surge tank 12) in the downstream side of the compressor 23; the openable/closable EGR valve 47 provided in the EGR passage 45; the bypass passage 42 provided at the exhaust passage 30 so as to bypass the turbine 22; the openable/closable waste gate valve 43 provided in the bypass passage 42; and the ECU 50 (the controller) that controls the EGR valve 47 and the waste gate valve 43 so as to prevent the boost pressure generated by the compressor 23 from exceeding the predetermined limit pressure Pi in the first operation area R1 (the specific operation area) set in an area on the high load side in the speed range where the engine speed becomes equal to or higher than the intercept speed Ni (the first rotational speed). Specifically, the ECU 50, when the boost pressure is increased to the limit pressure Pi, performs the first boost pressure control of opening the EGR valve 47 and closing the waste gate valve 43. In association with the opening of the EGR valve 47 in the first boost pressure control, when the EGR rate is increased to the predetermined upper limit value V (in other words, when the engine speed is increased to the rotational speed (the second rotational speed) corresponding to the line X in FIG. 4), performs the second boost pressure control of opening the waste gate valve 43 in addition to the EGR valve 47. Such a configuration has an advantage of being capable of performing as needed the boost pressure control of suppressing the boost pressure and improving the fuel economy performance of the engine at the same time.

In other words, in the embodiment, in a condition in which the flow rate of the exhaust gas becomes high (during operation in the first operation area R1), the first boost pressure control of opening the EGR valve 47 and closing the waste gate valve 43 is performed at first as a control for suppressing the boost pressure. When the EGR valve 47 is opened, since part of the exhaust gas is branched from the upstream side of the turbine 22 to the EGR passage 45 and returned to the intake passage 10, an amount of the exhaust gas flowing into the turbine 22 is reduced and the increase in the boost pressure is suppressed (maintained at the limit pressure Pi). In addition, the exhaust gas branched to the EGR passage 45 is returned to the intake passage 10 and plays a role of decreasing a difference between the exhaust pressure and the intake pressure. Thereby, pumping loss is effectively reduced and the fuel economy performance is improved.

To simply suppress the boost pressure may also be achieved by closing the EGR valve 47 and opening the waste gate valve 43. However, by doing so, an increment of the exhaust pressure to the intake pressure (same as the boost pressure) becomes large and the pumping loss is increased. In other words, when the waste gate valve 43 is opened in the high speed area equal to or higher than the intercept speed Ni, the exhaust pressure in the upstream side of the turbine 22 is gradually increased, while the boost pressure is maintained at the predetermined limit pressure Pi, as illustrated by a line (one-dot chain line) for "without EGR" in a graph of the exhaust pressure in FIG. 5. This is because, since the driving force of the turbine 22 is largely reduced just by slightly reducing the amount of the exhaust gas, when obtaining the boosting ability at an extent in which the boost pressure is maintained at the limit pressure Pi, the exhaust gas flowing into the turbine 22 may not be reduced so much, and consequently the exhaust pressure may not be suppressed as expected. Therefore, when the boost pressure is controlled by opening the waste gate valve 43, a difference ΔH2 between the exhaust pressure and the intake pressure becomes larger in the higher speed side and the pumping loss is increased.

On the contrary, in the embodiment, since the EGR valve 47 is opened and the waste gate valve 43 is closed as the first boost pressure control, as illustrated by a line for "with EGR" (solid line) in a graph of the exhaust pressure in FIG. 5, the increase in the exhaust pressure may be suppressed and the pumping loss may effectively be reduced. In other words, by the EGR valve 47 being opened, since the exhaust gas is returned to the intake passage 10 (specifically, to the surge tank 12 in the downstream side of the compressor 23) through the EGR passage 45 and the returned exhaust gas (the EGR gas) is added to the intake air, when assuming that the boost pressure (=the intake pressure) is constant, an amount of intake air to be compressed by the compressor 23 is reduced by the amount of the EGR gas added. Since this means that the driving force to be provided to the turbine 22 could be reduced, an amount of the exhaust gas flowing into the turbine 22 may be reduced more, and consequently, the exhaust pressure in the upstream of the turbine 22 may be suppressed lower. In this way, according to the first boost pressure control of controlling the boost pressure by the EGR, since, compared to a case where the boost pressure is controlled by opening the waste gate valve 43 (in other words, by discarding the exhaust gas to the downstream side of the turbine 22), a required boost pressure may be obtained even when the exhaust pressure is more lowered, the difference ΔH1 between the exhaust pressure and the intake pressure may be made smaller, the pumping loss is reduced, and the fuel economy performance is improved.

Although there is concern that engine torque is reduced when the EGR gas is mixed to the intake air, introducing the EGR gas in the high speed area equal to or higher than the intercept speed Ni does not necessarily lead immediately to the reduction in torque. In other words, although the torque of the turbocharged engine is roughly determined by three main factors, which are the boost pressure, an ignition timing, and an exhaust gas temperature limit, when the EGR gas is properly introduced in the first operation area R1 set in the high speed area (and in the high load area) equal to or higher than the intercept speed Ni, since knocking is suppressed and the exhaust gas temperature is reduced, the ignition timing may become possible to be advanced and specific power against the amount of air (and an amount of fuel injection determined in proportion thereto) to be introduced to the engine is increased. In addition, output is improved also by the reduction effect of the pumping loss. In this way, introducing the EGR gas, when the amount thereof is proper, may improve the fuel economy performance without reducing the engine torque.

On the other hand, when the first boost pressure control (a control of suppressing the boost pressure using the EGR) is continuously performed until the EGR rate exceeds the upper limit value V, it is concerned that problems such as reduction in combustion stability (or, a misfire) may result. Therefore, in the embodiment, when the EGR rate is increase to the upper limit value V in association with the first boost pressure control, the second boost pressure control of opening the waste gate valve 43 in addition to the EGR valve 47 is performed. Thereby, since part of the exhaust gas is returned to the intake passage 10 through the EGR passage 45 and part of other exhaust gas flows in the bypass passage 42 (in other words, bypasses the turbine 22), the amount of the exhaust gas flowing into the turbine 22 may sufficiently be reduced without excessively increasing the recirculation amount of the exhaust gas to the intake passage 10. As a result, the boost pressure may properly be controlled in a range where the limit pressure Pi is not exceeded while preventing the EGR rate from becoming too large and securely preventing the combustion stability from being degraded.

In the embodiment, during operation in the first operation area R1 where the first or the second boost pressure control is performed, fuel injection from the injector 9 is implemented in several injections so that a relatively rich air-fuel mixture (M2 in FIG. 7) is formed in the neighborhood of the spark plug 8 (the igniter). According to such a configuration, even when the first or the second boost pressure control, in which the inert EGR gas is introduced in the cylinders 2, is being performed, the air-fuel mixture may securely be ignited in association with the supply of the ignition energy from the spark plug 8 and the combustion stability is enhanced.

(5) Modification

Although in the embodiment, during operation in the first operation area R1 where the first or the second boost pressure control is performed, a split fuel injection is executed for enhancing the ignition performance of the air-fuel mixture, methods of enhancing the ignition performance of the air-fuel mixture is not limited to the split injection. Below, other modes that may be adopted for enhancing the ignition performance of the air-fuel mixture are described as a first or a second modification.

(5-1) First modification

Figure 8:
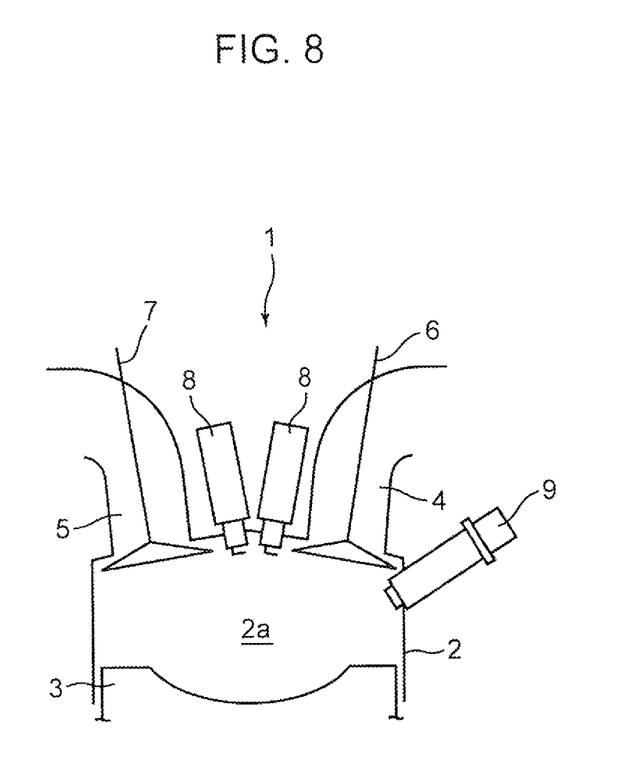
FIG. 8 is a view illustrating a modified example of the present invention.

Although in the embodiment, a spark plug 8 as an igniter is provided for each cylinder 2, in the first modification example as illustrated in FIG. 8, two spark plugs 8 are provided for each cylinder 2, and the ignition performance is improved using the two spark plugs 8.

Specifically, during the execution of the first or the second boost pressure control (during operation in the first operation area R1 illustrated in FIG. 4), a control of energizing two spark plugs 8 and discharging sparks from electrode parts of the tips thereof is performed. When sparks are discharged from two spark plugs 8, since ignition energy is doubled, air-fuel mixture may securely be ignited even under the environment where the inert EGR gas is present. On the other hand, in the residual operation areas R2 and R3 (FIG. 4) where the boost pressure control is not performed, energization to one of the two spark plugs 8 is cut off so that a spark is discharged only from the other spark plug. This aims at preventing an unnecessary spark discharge from occurring and suppressing energy consumption in the operation area R2 and R3 where there is no concern about ignition performance.

Although in the first modification example, the ignition energy provided to the air-fuel mixture is increased by providing a plurality of spark plugs 8, methods for increasing the ignition energy is not limited to providing a plurality of spark plugs 8 (a so called multipoint ignition). As an example other than the multipoint ignition, to adopt a plasma jet ignition that is practically used for an aircraft jet engine and such may be conceived.

A plasma jet ignition, by applying a high voltage to an electrode part of a spark plug equipped with a booster circuit and such for plasma generation, supplies the air-fuel mixture with high energy plasma generated at the electrode part as ignition energy. When such plasma jet ignition is performed in the first operation area R1, the ignition performance of the air-fuel mixture in the first operation area R1 where the EGR gas is introduced may securely be improved.

A spark plug for the plasma jet ignition may also ignite the air-fuel mixture by spark discharge similarly to the spark plug 8 of the embodiment by lowering an application voltage to the electrode part. Therefore it is desirable not to perform the plasma jet ignition but to perform the normal spark discharge to suppress the energy consumption in the residual operation areas R2 and R3 excluding the first operation area R1.

(5-2) Second Modification

Figure 9:
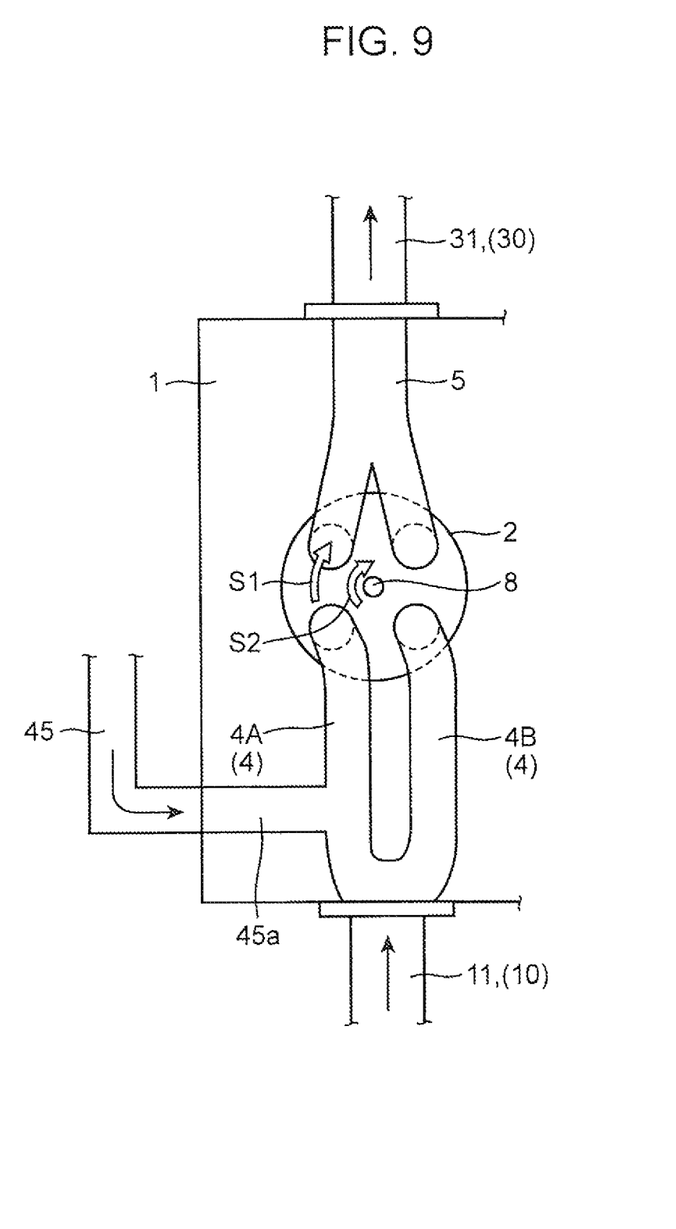
FIG. 9 is a view illustrating another modified example of the present invention.

In a second modification example illustrated in FIG. 9, an intake port 4 of each cylinder 2 is formed in a curve to generate a strong swirl flow in the cylinder 2, and the EGR gas is made to be intensively-distributed in the outer peripheral side of the cylinder 2 by the swirl flow.

Specifically, in the second modification example, two intake ports 4 connecting the intake passage 10 (independent intake passage 11) and each cylinder 2 are provided for each cylinder 2. Hereinafter, out of two intake ports 4, one is referred to as a first intake port 4A and the other is referred to as a second intake port 4B. The first intake port 4A includes a curved part in a neighborhood of an opening (a connecting part to the cylinder 2) in the downstream side that is curved in a direction different from a center of the cylinder 2, more specifically, in a direction roughly perpendicular to a line segment connecting a downstream side opening of the first intake port 4A and the center of the cylinder 2. On the other hand, although the second intake port 4B also includes a curved part similar to the first intake port 4A, a tip thereof is so set as to direct the center of the cylinder 2.

According to such a configuration, by intake air introduced from the first intake port 4A, a swirl flow S1 that flows so as to turn in a circumferential direction around an outer periphery of the cylinder 2 is formed, and by intake air discharged from the second intake port 4B, a small swirl flow S2 that turns around near the center part of the cylinder 2 is formed.

In the engine body 1, an EGR port 45a is formed as part of the downstream side of the EGR passage 45. The EGR port 45a is connected to the first intake port 4A that is created in a curved form for forming the outer peripheral side swirl flow S1.

When the EGR is performed in the second modification example, the EGR gas is introduced from the EGR port 45a to the first intake port 4A. Then, the EGR gas is introduced in the cylinder 2 by passing through the first intake port 4A, and mainly turns through the outer periphery of the cylinder 2 along the outer peripheral side swirl flow S1. In this way, the EGR gas is intensively-distributed in the outer periphery of the cylinder 2, and thereby, in the cylinder 2, a distribution in which concentration of the EGR gas is denser in outer peripheral side and is thinner in inner peripheral side is obtained. In other words, in the second modification example, an introduction position of the EGR gas into the cylinder 2 is so set that the EGR gas is intensively-distributed in the outer peripheral side of the cylinder 2 by the swirl flow generated in the cylinder 2.

In this way, according to the second modification example that is configured so that the EGR gas is intensively-distributed in the outer peripheral side of the cylinder 2, since the concentration of the EGR gas in the central part of the cylinder 2 may be made thin, by using the spark plug 8 that discharges a spark from the center of a ceiling part of the cylinder 2, the air-fuel mixture may securely be ignited.

(6) Others

Although in the embodiment and modification examples, descriptions are made by assuming that the engine is a spark-ignition engine, in other words, the engine is of a type in which a fuel including gasoline as a primary component is forced to be combusted led by spark discharge from a spark plug, an engine to which the present invention is applicable may be an engine equipped with a turbocharger, and basically, a combustion type of the engine itself may be of any type. Therefore, the present invention is applicable to a premixed compression ignition gasoline engine that combusts a fuel including gasoline as a primary component by self-ignition and to a diesel engine that combusts a fuel including light oil as a primary component by self-ignition.

When the present invention is applied to a premixed compression ignition gasoline engine, it may be acceptable to perform so-called ignition assist that promotes self-ignition of an air-fuel mixture (increases ignition energy) by providing each cylinder with a spark plug and performing spark discharge from a spark plug immediately before a desired ignition timing during operation in an operation area of high speed and high load (an area corresponding to the first operation area R1 in FIG. 4). Or, it may also be acceptable to enhance the ignition performance of an air-fuel mixture by providing ozone generating means capable of generating ozone in the intake passage or the cylinder, and supplying ozone from the ozone generating means during operation in the operation area of high speed and high load area.

On the other hand, when the present invention is applied to a diesel engine, ignition performance may be enhanced by providing each cylinder with a glow plug, and heating the inside of the cylinder by energizing the glow plug during operation in the operation area of high speed and high load (the region corresponding to the first operation area R1 in FIG. 4).

Although in the embodiment, not only in the first operation area R1 (the specific operation area) but also in the third operation area R3, the EGR valve 47 is opened and returned the exhaust gas cooled down by the EGR cooler 46 from the intake passage 10 to the exhaust passage 30 through the EGR passage 45, at least in a low load side (for instance, in a lower load side than the natural intake line NA) in the third operation area R3, a high temperature exhaust gas that is not cooled down by the EGR cooler 46 may be made to be recirculated. For that purpose, it may be conceived that, for instance, a bypass passage for bypassing the EGR cooler 46 is provided and the bypass passage is opened only in the low load side in the third operation area R3. Or, in the low load side in the third operation area R3, the exhaust gas generated in the cylinders 2 may be kept in the cylinders 2. A so-called internal EGR may be performed. The internal EGR may be achieved not only in an exhaust process but also in an intake process either by opening the exhaust valve 7 or by closing both the intake valve 6 and the exhaust valve 7 over a predetermined period of time across the exhaust top dead center.

(7) Embodiment Summary

Finally, characteristic configurations and functions and effects obtained on the basis thereof are summarized and described.

The turbocharged engine disclosed in the embodiments and such includes: an engine body including at least one cylinder; an intake passage for introducing air into the cylinder; an exhaust passage for discharging exhaust gas generated in the cylinder; a turbocharger including a turbine driven by energy of the exhaust gas passing through the exhaust passage and a compressor driven by the turbine to apply pressure to air in the intake passage; an EGR passage connecting the exhaust passage on an upstream side of the turbine and the intake passage on the downstream side of the compressor; an openable/closable EGR valve provided in the EGR passage; a bypass passage provided in the exhaust passage so as to bypass the turbine; an openable/closable waste gate valve provided in the bypass passage; and a controller for controlling the EGR valve and the waste gate valve so that boost pressure generated by the compressor does not exceed a predetermined limit pressure in a specific operation area set in at least part of a speed range in which an engine speed becomes equal to or higher than a predetermined first rotational speed. The controller implements, when the boost pressure is increased to the limit pressure, a first boost pressure control of opening the EGR valve and closing the waste gate valve, and implements, after starting the first boost pressure control and when the engine speed is increased to a second rotational speed higher than the first rotational speed, a second boost pressure control of opening the waste gate valve in addition to the EGR valve.

According to such a configuration, in a condition in which a flow rate of the exhaust gas is increased because the engine speed is equal to or higher than the first rotational speed (during operation in a specific operation area), the first boost pressure control of opening the EGR valve and closing the waste gate valve is performed at first as a control for suppressing the boost pressure. When the EGR valve is opened, since part of the exhaust gas is branched from the upstream side of the turbine to the EGR passage and is returned to the intake passage, an amount of the exhaust gas flowing into the turbine is reduced and increase in the boost pressure is suppressed. In addition, since the exhaust gas branched to the EGR passage is returned to the intake passage, the returned exhaust gas plays a role of decreasing a difference between the exhaust pressure and the intake pressure. Thereby, the pumping loss is effectively reduced and the fuel economy performance is improved.

However, when the first boost pressure control is performed with no exception in the specific operation area, the EGR rate becomes too high as the engine speed is increased, a problem may arise where reduction in combustion stability (or a misfire) occurs. To cope with such problems, in the configuration, when the engine speed is increased to the second rotational speed higher than the first rotational speed, the second boost pressure control of opening the waste gate valve in addition to the EGR valve is performed. Thereby, since part of the exhaust gas is returned to the intake passage through the EGR passage and part of other exhaust gas flows in the bypass passage (in other words, bypasses the turbine), an amount of the exhaust gas flowing into the turbine may sufficiently be reduced without excessively increasing an amount of recirculation of the exhaust gas to the intake passage. As a result, the boost pressure may properly be controlled within a range not exceeding the limit pressure while securely preventing the EGR rate from becoming too high and preventing the ignition performance from being degraded.

Here, as the first rotational speed, an engine speed may be adopted that corresponds to an intercept point that is an operation point positioned on a full load line of the engine where the boost pressure reaches the limit pressure.

In the configuration, preferably, the controller closes both the EGR valve and the waste gate valve in an operation area including a lower speed side range than the first rotational speed on the full load line of the engine.

In this way, a sufficient amount of air may be introduced into the cylinder in an operation area of low speed and high load, and the turbocharger may exhibit the maximum performance.

In the configuration, preferably, the controller increases an opening degree of the EGR valve as the engine speed is increased when the first boost pressure control is performed.

In this way, the boost pressure may properly be maintained at the limit pressure.

In the configuration, preferably, the second rotational speed is an engine speed at which the EGR rate is increased to a predetermined upper limit value as a result of the opening of the EGR valve in the first boost pressure control.

Thereby, an excessive increase in the boost pressure may be prevented while securing the combustion stability.

Here, the EGR rate is a value of a rate of an amount of the EGR gas to a total gas amount introduced to the cylinder expressed in percentage. In this case, the upper limit value of the EGR rate is preferred to be set at 20% or higher and 40% or lower.

In this way, both the combustion stability and the fuel economy may be achieved in a specific operation area where the first or the second boost pressure control is performed.

In the configuration, it is preferred that the controller increases an opening degree of the waste gate valve as the engine speed is increased and maintains an opening degree of the EGR valve at a constant value regardless of the engine speed, when the second boost pressure control is performed.

In this way, the boost pressure may properly be kept at the limit pressure even under operating conditions in which the flow rate of the exhaust gas is particularly high.

In the configuration, preferably, the EGR passage is provided with an EGR cooler configured to cool down the EGR gas.

In this way, when the high temperature exhaust gas is made to be recirculated back to the intake passage after being cooled down by the EGR cooler, at the time of executing the first or the second boost pressure control, reduction in concentration of air introduced to the cylinder may be prevented and an output torque of the engine may sufficiently be secured.

The engine may further include: an igniter configured to supply ignition energy for igniting an air-fuel mixture into the cylinder; and an injector configured to inject fuel into the cylinder. In this case, the controller is preferred to perform a control of splitting fuel injecting from the injector into several injections so that a relatively rich air-fuel mixture is formed in a neighborhood of the igniter when the first or second boost pressure control is performed.

In this way, when a rich air-fuel mixture is made to be formed in a neighborhood of the spark plug, even when the inert EGR gas is introduced into the cylinder in association with the first or the second boost pressure control, the air-fuel mixture may securely be ignited in association with the supply of the ignition energy from the igniter and the combustion stability may be enhanced.

In a case where the engine is equipped with the igniter for supplying the ignition energy for igniting the air-fuel mixture into the cylinder, the controller is preferred to perform a control for increasing the ignition energy supplied by the igniter when the first or second boost pressure control is performed.

In this way, also by increasing the ignition energy supplied from the igniter, the ignition performance of the air-fuel mixture under the environment where the EGR gas is present may be enhanced.

The engine may further include a swirl generator for generating a swirl flow in the cylinder. In this case, it is preferable that an introduction position of the EGR gas to the cylinder is set so that the EGR gas introduced from the EGR passage into the cylinder is intensively-distributed on an outer peripheral side of the cylinder by the swirl flow.

In this way, when the EGR gas is made to be intensively-distributed in the outer peripheral side of the cylinder, since concentration of the EGR gas in a central part of the cylinder may be made low, by using an igniter for supplying ignition energy from a center of a ceiling part of the cylinder, for instance, the air-fuel mixture may securely be ignited.

The invention claimed is:

1. A turbocharged engine, comprising;
an engine body including at least one cylinder;
an intake passage for introducing air into the cylinder;
an exhaust passage for discharging exhaust gas generated in the cylinder;
a turbocharger including a turbine driven by energy of the exhaust gas passing through the exhaust passage and a compressor driven by the turbine to apply pressure to air in the intake passage;
an EGR passage connecting the exhaust passage on an upstream side of the turbine and the intake passage on a downstream side of the compressor;
an openable/closable EGR valve provided in the EGR passage;
a bypass passage provided in the exhaust passage so as to bypass the turbine;
an openable/closable waste gate valve provided in the bypass passage; and
a controller for controlling the EGR valve and the waste gate valve so as to prevent boost pressure generated by the compressor from exceeding a predetermined limit pressure in a specific operation area set in at least part of a speed range in which an engine speed becomes equal to or higher than a predetermined first rotational speed, wherein
the controller implements, when the boost pressure is increased to the limit pressure, a first boost pressure control of opening the EGR valve and closing the waste gate valve, and implements, after the first boost pressure control is started and when the engine speed is increased to a second rotational speed higher than the first rotational speed, a second boost pressure control of opening the waste gate valve in addition to the EGR valve.

2. The turbocharged engine according to claim 1, wherein the first rotational speed is an engine speed corresponding to an intercept point that is an operation point positioned on a full load line of the engine where the boost pressure reaches the limit pressure.

3. The turbocharged engine according to claim 2, wherein the controller closes both the EGR valve and the waste gate valve in an operation area including a lower speed side range than the first rotational speed on the full load line of the engine.

4. The turbocharged engine according to claim 1, wherein the controller increases an opening degree of the EGR valve as the engine speed is increased when the first boost pressure control is performed.

5. The turbocharged engine according to claim 1, wherein the second rotational speed is an engine speed at which the EGR rate is increased to a predetermined upper limit value as a result of the opening of the EGR valve in the first boost pressure control.

6. The turbocharged engine according to claim 5, wherein the EGR rate is a value of a rate of an amount of the EGR gas to a total gas amount introduced to the cylinder expressed in percentage.

7. The turbocharged engine according to claim 6, wherein the upper limit value of the EGR rate is set at equal to or higher than 20% and equal to or lower than 40%.

8. The turbocharged engine according to claim 1, wherein the controller increases an opening degree of the waste gate valve as the engine speed is increased and maintain an opening degree of the EGR valve at a constant value regardless of the engine speed, when the second boost pressure control is performed.

9. The turbocharged engine according to claim 1, wherein the EGR passage is provided with an EGR cooler configured to cool down the EGR gas.

10. The turbocharged engine according to claim 1 further comprising:
an igniter configured to supply ignition energy for igniting an air-fuel mixture into the cylinder; and
an injector configured to inject fuel into the cylinder, wherein
the controller splits fuel injecting from the injector into several injections so that a relatively rich air-fuel mixture is formed near the igniter when the first or second boost pressure control is performed.

11. The turbocharged engine according to claim 1, further comprising
an igniter configured to supply ignition energy for igniting the air-fuel mixture into the cylinder, wherein
the controller increases the ignition energy supplied by the igniter when the first or second boost pressure control is performed.

12. The turbocharged engine according to claim 1, wherein
a position of introducing the EGR gas into the cylinder is set so that the EGR gas introduced from the EGR passage into the cylinder is intensively-distributed on an outer peripheral side of the cylinder.

\* \* \* \* \*